(12) United States Patent
Grady et al.

(10) Patent No.: US 7,547,478 B2
(45) Date of Patent: Jun. 16, 2009

(54) ARTICLE INCLUDING A SUBSTRATE WITH A METALLIC COATING AND A PROTECTIVE COATING THEREON, AND ITS PREPARATION AND USE IN COMPONENT RESTORATION

(75) Inventors: Wayne Ray Grady, Fairfield, OH (US); Thomas Joseph Kelly, Cincinnati, OH (US); Michael James Weimer, Loveland, OH (US); Nripendra Nath Das, West Chester, OH (US); Mark Alan Rosenzweig, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 10/318,760

(22) Filed: Dec. 13, 2002

(65) Prior Publication Data
US 2004/0115462 A1 Jun. 17, 2004

(51) Int. Cl.
B32B 15/04 (2006.01)
B32B 18/00 (2006.01)

(52) U.S. Cl. .................. 428/632; 428/650; 428/655; 428/670; 428/680; 428/469; 428/697; 428/701; 427/585; 427/427; 427/252; 427/255.7; 416/241 R; 416/241 B

(58) Field of Classification Search .............. 428/621, 428/632, 633, 650, 655, 670, 679, 680, 469, 428/697, 699, 701, 702; 416/241 B, 241 R; 427/585, 596, 252, 255.7, 427, 455, 456
See application file for complete search history.

(56) References Cited

U.S. PATENT DOCUMENTS 4,123,594 A 10/1978 Chang
4,246,323 A * 1/1981 Bornstein et al.
5,247,866 A 9/1993 O'Malley
5,403,669 A 4/1995 Gupta et al.
5,427,866 A 6/1995 Nagaraj et al.
5,498,484 A * 3/1996 Duderstadt (Continued)

FOREIGN PATENT DOCUMENTS

EP 0 821 078 A1 1/1998

(Continued)

OTHER PUBLICATIONS

Definition of "repair" obtained from the Merriam-Webster Dictionary as set forth at http://www.merriam-webster.com/dictionary, no date.*

*Primary Examiner*—John J. Zimmerman
*Assistant Examiner*—Aaron Austin
(74) *Attorney, Agent, or Firm*—McNees Wallace & Nurick, LLC

(57) ABSTRACT

A coated article has a metallic substrate with a substrate composition, and a metallic coating overlying and contacting the metallic substrate. The metallic coating has a metallic-coating composition different from the substrate composition. A protective coating overlies and contacts the metallic coating. The protective coating includes an aluminide layer overlying and contacting the metallic coating, and optionally a thermal barrier coating overlying and contacting the aluminide layer. This structure may be used to restore a key dimension of an article that has previously been in service and to protect the article as well.

17 Claims, 2 Drawing Sheets

U.S. PATENT DOCUMENTS

| | | | |
|---|---|---|---|
| 5,525,429 A * | 6/1996 | Mannava et al. | 428/610 |
| 5,783,318 A * | 7/1998 | Biondo et al. | 428/680 |
| 5,846,605 A | 12/1998 | Rickerby | |
| 6,036,995 A | 3/2000 | Kircher et al. | |
| 6,095,755 A * | 8/2000 | Houston | 416/241 R |
| 6,129,991 A * | 10/2000 | Warnes et al. | |
| 6,139,976 A * | 10/2000 | Czech et al. | |
| 6,233,822 B1 * | 5/2001 | Grossklaus et al. | 29/889.1 |
| 6,283,715 B1 | 9/2001 | Nagaraj et al. | |
| 6,299,986 B1 * | 10/2001 | Meelu | |
| 6,354,799 B1 * | 3/2002 | Mukira et al. | 415/200 |
| 6,435,835 B1 * | 8/2002 | Allen et al. | 416/241 R |
| 6,461,746 B1 * | 10/2002 | Darolia et al. | 428/632 |
| 6,465,040 B2 * | 10/2002 | Gupta et al. | |
| 6,652,914 B1 * | 11/2003 | Langley et al. | 427/376.8 |
| 2002/0119043 A1 | 8/2002 | Allen et al. | |
| 2002/0130047 A1 * | 9/2002 | Allen et al. | 205/183 |

FOREIGN PATENT DOCUMENTS

| | | | |
|---|---|---|---|
| EP | 0 921 209 A2 | | 6/1999 |
| GB | 2322382 | * | 8/1998 |
| WO | 9634130 A1 | | 10/1996 |

* cited by examiner

ARTICLE INCLUDING A SUBSTRATE WITH A METALLIC COATING AND A PROTECTIVE COATING THEREON, AND ITS PREPARATION AND USE IN COMPONENT RESTORATION

This invention relates to the protection of a substrate using a protective coating and, more particularly, to the restoration of a key dimension of an article such as a gas turbine component that has previously been in service.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine section mounted on the same shaft. In the turbine section, the hot combustion-gas flow passes between pairs of turbine vanes (also sometimes termed the "nozzles"), which redirect the combustion-gas flow slightly, and impinges upon the turbine blades. The impingement of the flow of hot combustion gas against an airfoil section of the turbine blades turns the shaft and provides power to the compressor. The hot exhaust gases flow from the back of the engine, driving it and the aircraft forward.

The hotter the combustion and exhaust gases, the more efficient is the operation of the jet engine. There is thus an incentive to raise the combustion and exhaust gas temperatures. However, at these high temperatures the combustion-gas flow is highly corrosive, erosive, and oxidative to the materials it contacts. The maximum temperature of the combustion gases is normally limited by the materials used to fabricate the turbine components of the engine, including the turbine blades and vanes. The turbine components must have the necessary strength, but also be resistant to the environmental damage caused by the combustion-gas flow, at the operating temperature. In current engines, the turbine vanes and blades are made of cobalt alloys and nickel-based superalloys, and can operate at temperatures of up to about 1800-2100° F. These components are subject to environmental damage by corrosion, erosion, and oxidation at those temperatures.

Many approaches have been used to increase the operating temperature limits and service lives of the turbine blades and vanes to their current levels, while achieving acceptable environmental resistance. The composition and processing of the base materials themselves have been improved. Cooling techniques are used, as for example by providing the component with internal cooling passages through which cooling air is flowed.

In another approach used to protect the turbine-section components, a portion of the surfaces of the turbine blades or vanes is coated with a protective coating. One type of protective coating includes an aluminum-containing protective coating deposited upon the substrate material to be protected. The exposed surface of the aluminum-containing protective coating oxidizes to produce an aluminum oxide protective scale that protects the underlying surface. A ceramic thermal barrier coating may be applied over the aluminum-containing protective coating to further protect and insulate the substrate.

Despite careful selection of the base materials and protective coating, after a gas turbine component has been in service, it is usually eroded, corroded, and oxidized so that one or more key dimensions of the component may be reduced below respective minimum permissible dimensional values. An example relates to the throat separation dimension between each adjacent pair of gas turbine vanes, the space through which the hot combustion-gas flows from the combustor on its way to contact the turbine blades. The throat dimension between two adjacent gas turbine vanes has its maximum permissible dimensional value that cannot be exceeded without reducing the performance and efficiency of the gas turbine. When the gas turbine vanes are operated in service, their surfaces are worn away so that a key thickness dimension of the vanes become dimensionally smaller. Consequently, the vane-to-vane gas-flow throat-separation dimension becomes larger and the maximum permissible throat-separation dimensional value is eventually exceeded as the key thickness dimension of the vanes falls below its minimum permitted key thickness dimension.

The gas turbine components are expensive to fabricate, and it is therefore desirable, where feasible and the service damage is not too great, to repair and restore them, rather than to discard them. No restoration procedure has been proposed for these protected components to restore dimensions and also to restore the protective structure, and therefore a need exists for such a restoration procedure. The present invention fulfills this need, and further provides related advantages.

SUMMARY OF THE INVENTION

The present approach provides an article that is protected against environmental damage, and is also dimensionally controlled. The approach may be used to restore dimensions of articles that have previously been in service, and whose dimensions are reduced below minimum permissible dimensional values during that service. It may also be used with newly made articles if their dimensions must be increased.

A coated article comprises a metallic substrate having a substrate composition and a metallic coating overlying and contacting the metallic substrate. The metallic coating has a metallic-coating composition different from the substrate composition. The metallic-coating composition must be readily and controllably depositable in thin layers, such as those in the range of from about 0.003 to about 0.015 inch, but at a rate sufficiently high to be economically feasible. A protective coating overlies and contacts the metallic coating. The protective coating comprises an aluminide layer overlying and contacting the metallic coating and, optionally, a ceramic thermal barrier coating overlying and contacting the aluminide layer.

In a case of interest, the substrate is a component of a gas turbine engine, such as a turbine blade or turbine vane (nozzle). The substrate composition is preferably either a nickel-base alloy, such as a nickel-base superalloy, or a cobalt-base alloy. In an application of most interest, the substrate is a component of a gas turbine engine that has previously been in service without the metallic coating thereon.

Where a key dimension of the article has been reduced below its minimum permissible dimensional value during service as a result of the removal of substrate material due to environmental factors, the key dimension cannot be restored simply by making the protective coating thicker during the repair procedure, in many cases. The thicknesses of the layer or layers of the protective coating are optimized to provide the necessary protection, stability, and resistance to removal during subsequent service. Specifically, if the aluminide layer and/or the ceramic thermal barrier coating are made overly thick, there is a tendency for them to spall away as a result of thermally induced stresses and other reasons. Additionally, the protective coating does not have the same mechanical properties as the substrate material, so that replacement of the removed substrate material with the material of the protective coating results in a net weakening of the article.

In applications of the present approach, the metallic coating is applied to the substrate to build up the thickness of the substrate, before the protective coating is applied. The metallic coating has a composition different from that of the substrate. The metallic coating is selected both for having good mechanical properties that are similar to those of the substrate material, but also for its ability to be deposited in a moderately thick layer. In a typical example, the metallic coating has a thickness of at least about 0.003 inch, preferably from about 0.003 to about 0.010 inch, but in some cases as thick as 0.015 inch or more. The metallic coating restores the thickness of the substrate back to about its original thickness, less the thickness of the protective coating, and then the optimal protective coating is applied over the metallic coating to restore the required overall key dimension.

The metallic coating is not a diffusion aluminide protective coating and is not an overlay aluminide protective coating. The diffusion aluminide protective coating and the overlay aluminide protective coating have a high aluminum content, typically above about 16 percent by weight. Such high-aluminum coatings give good oxidation protection, but they do not have mechanical properties comparable with the substrate material. In the case where the metallic coating is a nickel-base alloy, and preferably a nickel-base superalloy, the aluminum content is typically less than about 10 percent by weight, and there is a high content of other elements found in superalloys for strength and other properties, such as tantalum, tungsten, molybdenum, chromium, rhenium, zirconium, titanium, niobium, boron, and/or carbon.

The aluminide layer is desirably a platinum-group metal-aluminide layer. That is, the aluminide is formed by interdiffusing an applied aluminum sublayer with an applied sublayer of platinum, palladium, or rhodium. The aluminide layer may also be formed by interdiffusing an applied aluminum sublayer with an applied sublayer of another element such as chromium. The aluminide layer may instead be a simple aluminide.

A method for restoring a key dimension of and protecting an article comprises first providing an article that has previously been in service, wherein the key dimension of the article is below a minimum permissible dimensional value. The article serves as a substrate having a substrate composition. A metallic coating is deposited overlying and contacting the metallic substrate, wherein the metallic coating has a metallic-coating composition different from the substrate composition. A protective coating is applied overlying and contacting the metallic coating, wherein the metallic coating and the protective coating together have a restoration thickness sufficient to increase the key dimension to no less than the minimum permissible dimensional value. The protective coating comprises an aluminide layer overlying and contacting the metallic coating. Compatible features discussed herein may be used with this method.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
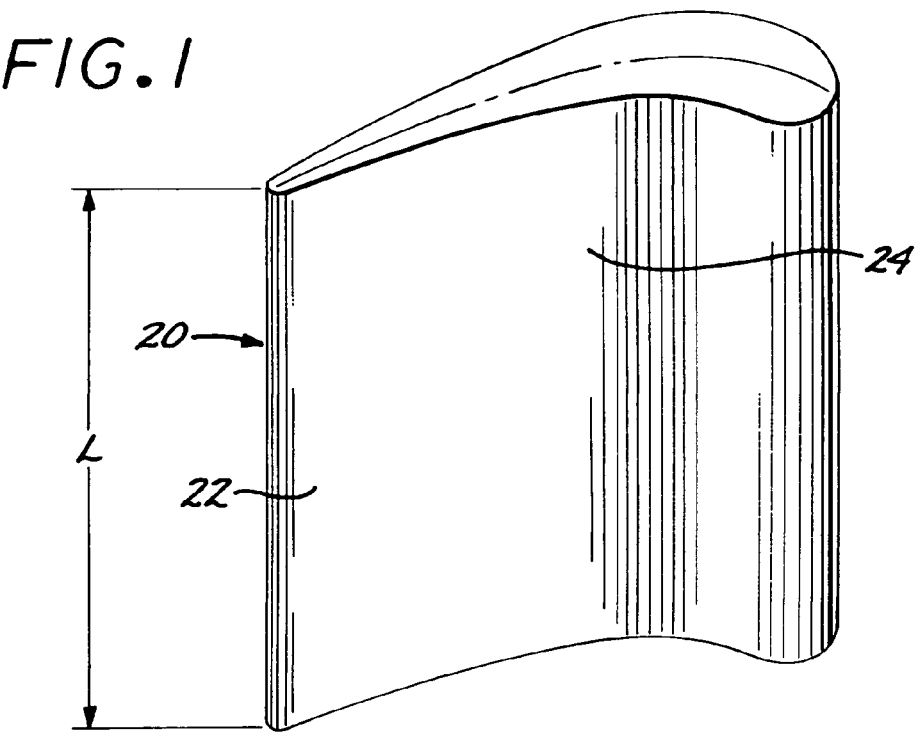
FIG. 1 is a perspective view of a gas turbine vane airfoil.

FIG. 1 depicts a portion of an article 20 that is an embodiment of the present approach and may be prepared by the present approach. In this case, the article 20 is a component of a gas turbine engine, and specifically a gas turbine vane 22 (also called a "nozzle"). The gas turbine vane 22 has the illustrated airfoil 24 and is attached to its support by end structure (not shown). The present approach is not limited to a turbine vane, which is the preferred application but which is presented as an example.

Figure 2:
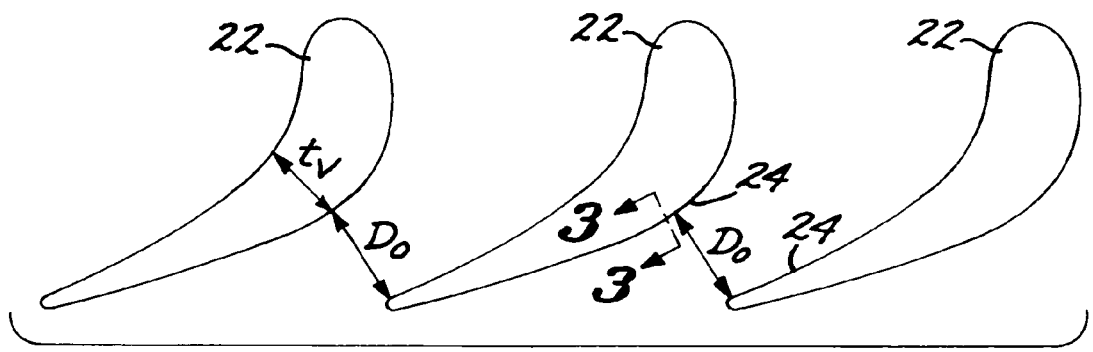
FIG. 2 is a schematic plan view of three gas turbine vanes, forming two pairs of vanes.

FIG. 2 depicts three of the turbine vanes 22 arranged relative to each other as they are in a gas turbine engine. The turbine vanes 22 may be described as being two adjacent pairs of turbine vanes. A throat separation dimension $D_O$ is the distance of closest approach between the two vanes of each pair. The throat area TA is the product of the throat width $D_O$ times the length L of the airfoil measured parallel to the lengthwise direction of the airfoil 24 (see FIG. 1). To maintain the throat area TA within its required tolerances, $D_O$ must be kept within its required tolerances. During service, the thickness $t_V$ of the turbine vanes 22 tends to decrease due to environmental damage, so that $D_O$ increases. However, if $D_O$ becomes too large and exceeds its maximum permitted throat separation dimension, the operation and efficiency of the gas turbine engine unacceptably decreases. Thus, the thickness $t_V$ must be equal to or greater than the minimum permissible dimensional value $t_{V,MIN}$. The situation wherein $t_V$ becomes less than $t_{V,MIN}$ usually arises after the turbine vane 22 is operated in service, but it may arise in new-make articles are well.

Figure 3:
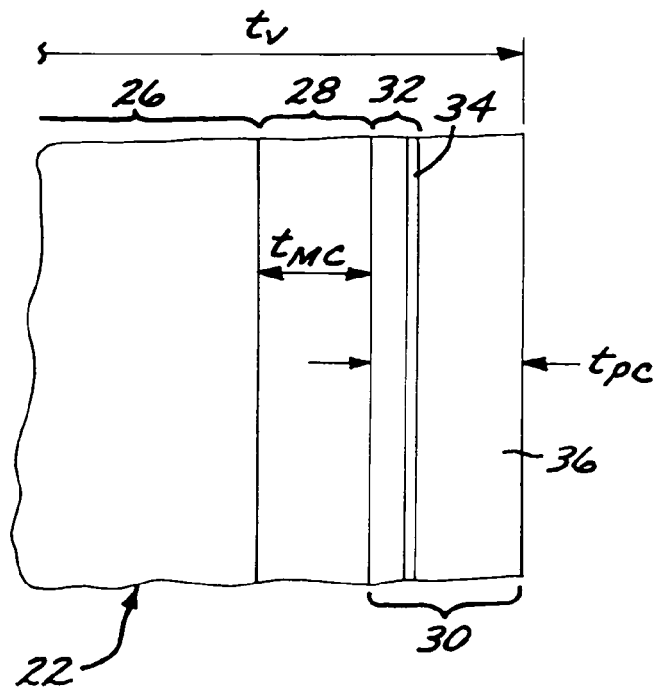
FIG. 3 is an enlarged sectional view of one of the gas turbine vanes of FIG. 2, taken generally on line 3-3.

FIG. 3 depicts the surface region of the turbine vane 22 in greater detail. The body of the turbine vane 22 serves as a substrate 26 having a substrate composition. The substrate composition is preferably that of a nickel-base alloy such as a nickel-base superalloy, or a cobalt-base alloy. An "X-base" alloy is an alloy having more of element X by weight than any other element. A nickel-base superalloy is a nickel-base alloy that is strengthened by the precipitation of gamma prime or a related phase. A cobalt-base alloy has more cobalt by weight than any other element, and a cobalt-base superalloy typically is strengthened by the presence of large atoms that provide solid solution strengthening and by the precipitation of carbide phases. An example of a cobalt-base substrate composition of most interest is MAR M-509, having a nominal composition, in weight percent, of about 0.6 percent carbon, about 0.1 percent manganese, about 0.4 percent silicon, about 22.5 percent chromium, about 0.2 percent titanium, about 1.5 percent iron, about 0.01 percent boron, about 0.5 percent zirconium, about 10 percent nickel, about 7 percent tungsten, about 3.5 percent tantalum, balance cobalt and minor elements. The present approach is not limited to this alloy, which is presented as an example.

A metallic coating 28 overlies and contacts the metallic substrate 26. The metallic coating 28 has a metallic-coating composition different from the substrate composition. The metallic coating 28 has a composition different from that of the substrate that may be readily deposited onto the substrate 26. Most substrate compositions simply cannot be readily deposited as thin layers by readily available and economically feasible deposition techniques, such as those that may be used for the metallic-coating composition. The metallic coating 28 is metallic in nature, and is not a diffusion aluminide protective coating and is not an overlay aluminide protective coating. The diffusion aluminide protective coating and the overlay aluminide protective coating have a high aluminum content, typically above about 16 percent by weight. Such high-aluminum coatings give good oxidation protection, but they do not have mechanical properties comparable with the substrate composition. In the case where the metallic coating 28 is a nickel-base alloy, and preferably a nickel-base superalloy, the aluminum content is typically less than about 10 percent by weight, and there is a high content of other elements found in superalloys for strength and other properties, such as tantalum, tungsten, molybdenum, chromium, rhenium, zirconium, titanium, niobium, boron, and/or carbon. A preferred metallic coating 28 is alloy BC-52, having a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities. The present approach is not limited to this metallic coating 28, however.

A protective coating 30 overlies and contacts the metallic coating 28. The protective coating 30 includes at least an aluminide layer 32 overlying and contacting the metallic coating 28. The aluminide layer 32 is preferably a platinum-group metal-aluminide layer. The platinum-group metal aluminide comprises interdiffused aluminum and a platinum-group metal, preferably platinum, palladium, and/or rhodium, and most preferably platinum. The aluminide layer 32 partially interdiffuses with the metallic coating 28 after exposure at elevated temperature. The aluminide layer 32 preferably has at least about 16 percent by weight aluminum and 16 percent by weight of the platinum-group metal.

After exposure to oxygen at elevated temperature, an outermost portion of the aluminide layer 32 oxidizes to produce an aluminum oxide (alumina) scale 34. The aluminum oxide scale 34 resists further oxidation, protecting the underlying structure. For the present purposes, the aluminum oxide scale 34 is considered part of the aluminide layer 32.

Optionally, a ceramic thermal barrier coating 36 is part of the protective coating 30 and overlies and contacts the aluminide layer 32. The thermal barrier coating 36 is preferably zirconia having from about 3 to about 12 percent yttria therein, a ceramic termed yttria-stabilized zirconia, or YSZ.

The aluminide layer 32 preferably has a thickness of from about 0.0005 to about 0.004 inch thick. The ceramic thermal barrier coating 36, where present, preferably has a thickness of from about 0.005 to about 0.020 inch, more preferably from about 0.005 to about 0.015 inch. These thicknesses are selected because of the requirement for protection of the underlying structure, and also so that the respective thicknesses are not so great that the aluminide layer 32 and ceramic thermal barrier coating 36 debond from their respective underlying structures. These thicknesses cannot be substantially increased to replace metal lost or absent from the underlying substrate 26. Instead, the metallic coating 28 replaces the metal lost or absent from the substrate 26, to bring the dimension $t_V$ back to above the minimum permissible dimensional value $t_{V,MIN}$. The metallic coating 28 has strength properties generally similar to those of the substrate 26, so that replacement of the lost metal of the substrate 26 with the metallic coating 28 does not result in a substantial loss of overall strength properties of the article 20. The materials of the protective coating 30, on the other hand, are much weaker than the material of the substrate 26. In a typical case, the metallic coating 28 has a thickness of at least about 0.003 inch and in some cases as high as about 0.015 inch, and usually has a thickness of from about 0.005 to about 0.010 inch.

Figure 4:
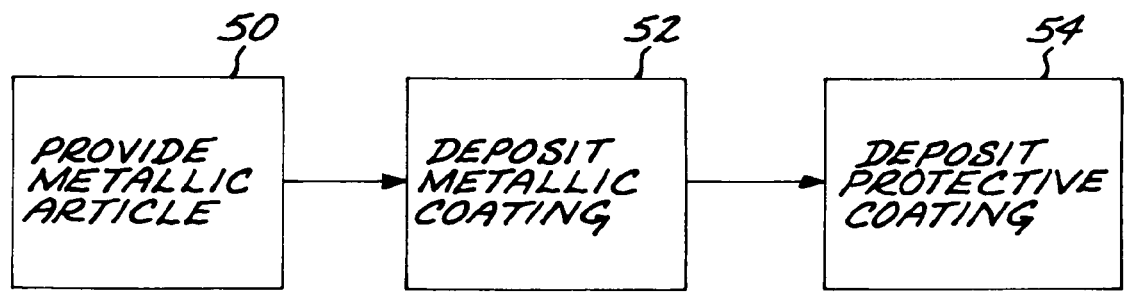
FIG. 4 is a block flow diagram of a preferred approach for practicing the present approach.

FIG. 4 depicts a preferred method of practicing the invention to restore a key dimension such as $t_V$ and to protect the article 20. The metallic article 20 or 22 that has previously been in service is provided, step 50. The metallic article is preferably made of a cobalt-base alloy or a nickel-base alloy. The key dimension $t_V$ of the article 20 is below the minimum permissible dimensional value $t_{V,MIN}$. The key dimension may instead be below the minimum permissible dimensional value in a new-make article, but the situation most often arises in a repair context. The article 20 or 22 serves as the metallic substrate 26 having the substrate composition.

The metallic coating 28 is deposited overlying and contacting the metallic substrate 26, step 52. The metallic coating 28 has its metallic-coating composition different from the substrate composition. In the preferred case, the BC-52 nickel-base superalloy metallic coating is applied by any operable approach, but is preferably applied by the HVOF (high-velocity oxyfuel) process or the LPPS (low-pressure-plasma spray) process, both of which are deposition processes that are known in the art. The HVOF process, which utilizes a high velocity gas as a protective shield to prevent oxide formation, is a relatively low temperature thermal spray that allows for application of a high density oxide-free coating in a wide variety of thicknesses, is known in the art. The HVOF process typically uses any one of a variety of fuel gases, such as oxypropylene, oxygen/hydrogen mixtures or kerosene. Gas flow of the fuel can be varied from 2000-5000 ft/sec. The temperature of the spray will depend on the combustion temperature of the fuel gas used, but will typically be in the range of 3000-5000° F. The LPPS process applies the coating as a plasma spray at a reduced deposition pressure.

The protective coating 30 is deposited overlying and contacting the metallic coating, step 54. The metallic coating 28 and the protective coating 30 together have a restoration thickness sufficient to increase the key dimension $t_V$ to no less than the minimum permissible dimensional value $t_{V,MIN}$.

To deposit the aluminide layer in the preferred form of a platinum aluminide, a platinum-containing layer is first deposited onto the surface of the metallic coating 28. The platinum-containing layer is preferably deposited by electrodeposition. For the preferred platinum deposition, the deposition is accomplished by placing a platinum-containing solution into a deposition tank and depositing platinum from the solution onto the surface of the metallic coating 28. An operable platinum-containing aqueous solution is $Pt(NH_3)_4 HPO_4$ having a concentration of about 4-20 grams per liter of platinum, and the voltage/current source is operated at about ½-10 amperes per square foot of facing article surface. The platinum-containing layer, which is preferably from about 1 to about 6 micrometers thick and most preferably about 5 micrometers thick, is deposited in 1-4 hours at a temperature of 190-200° F.

A layer comprising aluminum and any modifying elements is deposited over the platinum-containing layer by any operable approach, with chemical vapor deposition preferred. In that approach, a hydrogen halide activator gas, such as hydrogen chloride, is contacted with aluminum metal or an aluminum alloy to form the corresponding aluminum halide gas.

Halides of any modifying elements are formed by the same technique. The aluminum halide (or mixture of aluminum halide and halide of the modifying element, if any) contacts the platinum-containing layer that overlies the metallic coating 28, depositing the aluminum thereon. The deposition occurs at elevated temperature such as from about 1825° F. to about 1975° F. so that the deposited aluminum atoms interdiffuse with the platinum-containing layer and somewhat with the uppermost portion of the metallic coating 28 during a 4 to 20 hour cycle.

Where used, the ceramic thermal barrier coating 36 is deposited, preferably by a physical vapor deposition process such as electron beam physical vapor deposition (EBPVD). The ceramic thermal barrier coating 36 is preferably from about 0.005 to about 0.020 inch thick. The ceramic thermal barrier coating 42 is preferably yttria-stabilized zirconia (YSZ), which is zirconium oxide containing from about 3 to about 12 weight percent, preferably from about 6 to about 8 weight percent, of yttrium oxide. Other operable ceramic materials may be used as well. Examples include yttria-stabilized zirconia which has been modified with additions of "third" oxides such as lanthanum oxide, ytterbium oxide, gadolinium oxide, cerium oxide, neodymium oxide, tantalum oxide, or mixtures of these oxides, which are co-deposited with the YSZ.

The present invention has been reduced to practice. Nozzle segments that have been previously been in service have been repaired by the approach discussed above on a prototype-process basis. The dimension $t_V$ was initially below the specification limit, and was increased to within the specification limit by the present approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A coated article comprising:
    a metallic substrate having a substrate composition and an original thickness;
    a metallic coating overlying and contacting the metallic substrate, wherein the metallic coating has a metallic-coating composition different from the substrate composition, wherein the metallic coating is a precipitation-strengthened nickel-base superalloy having less than about 10 percent by weight aluminum, is not a diffusion aluminide protective coating having above about 16 percent by weight aluminum and is not an MCrAlY-type overlay coating having above about 16 percent by weight aluminum, and wherein the substrate is a component of a gas turbine engine that has previously been in service without the metallic coating thereon, the metallic coating restoring a portion of the substrate to the original thickness, the metallic coating having a thickness of from about 0.003 inch to about 0.015 inch; and
    a protective coating overlying and contacting the metallic coating, wherein the protective coating comprises
        an aluminide diffusion coating layer overlying and contacting the metallic coating, wherein the aluminide diffusion coating layer comprises at least about 16 percent by weight aluminum and at least about 16 percent by weight of a platinum group metal; and
        a ceramic thermal barrier coating overlying and contacting the aluminide diffusion coating layer;
    wherein the article is dimensionally controlled.

2. The article of claim 1, wherein the substrate composition is selected from the group consisting of a nickel-base alloy and a cobalt-base alloy.

3. The coated article of claim 1, wherein the metallic coating has a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities.

4. The article of claim 1, wherein the article is a gas turbine vane.

5. A coated article comprising:
    a metallic substrate that is a component of a gas turbine engine and has a substrate composition selected from the group consisting of a nickel-base alloy and a cobalt-base alloy, the metallic substrate having an original thickness;
    a metallic coating overlying and contacting the metallic substrate, wherein the metallic coating is a precipitation-strengthened nickel-base superalloy having a metallic-coating composition different from the substrate composition, and wherein the substrate has previously been in service without the metallic coating thereon, the metallic coating restoring the metallic substrate to about the original thickness and having a thickness of from about 0.003 inch to about 0.015 inch; and
    a protective coating overlying and contacting the metallic coating, wherein the protective coating comprises
        a platinum-group metal-aluminide diffusion coating layer overlying and contacting the metallic coating, and
        a ceramic thermal barrier coating overlying and contacting the aluminide diffusion coating layer,
        wherein the coated article is dimensionally; and
        wherein the aluminide diffusion coating layer comprises at least about 16 percent by weight aluminum and at least about 16 percent by weight of a platinum group metal.

6. The coated article of claim 5, wherein the metallic coating has a nominal composition, in weight percent, of about 18 percent chromium, about 6.5 percent aluminum, about 10 percent cobalt, about 6 percent tantalum, about 2 percent rhenium, about 0.5 percent hafnium, about 0.3 percent yttrium, about 1 percent silicon, about 0.015 percent zirconium, about 0.015 percent boron, about 0.06 percent carbon, the balance nickel and incidental impurities.

7. The article of claim 5, wherein the article is a gas turbine vane.

8. A method for restoring a key dimension of and protecting an article, comprising the steps of
    providing an article that has previously been in service, wherein the key dimension of the article is below a minimum permissible dimensional value as a result of the previous service, and wherein the article serves as a metallic substrate having a substrate composition having an original thickness and a protective coating overlying the substrate;
    depositing a metallic coating overlying and contacting the metallic substrate to restore the metallic substrate to about the original thickness, wherein the metallic coating has a metallic-coating composition different from the substrate composition and the metallic coating has a thickness of from about 0.0003 inch to about 0.015 inch; and
    depositing a protective coating overlying and contacting the metallic coating, wherein the metallic coating and the protective coating together have a restoration thickness sufficient to increase the key dimension to no less than the minimum permissible dimensional value, and wherein the protective coating comprises an aluminide diffusion coating layer overlying and contacting the metallic coating,
wherein the aluminide diffusion coating layer comprises at least about 16 percent by weight aluminum and at least about 16 percent by weight of a platinum group metal; and
a ceramic thermal barrier coating overlying and contacting the aluminide diffusion coating layer;
and wherein the protective coating is deposited to a thickness sufficient to resist debonding.

9. The method of claim 8, wherein the step of providing the article includes the step of
providing the article having the substrate composition selected from the group consisting of a nickel-base alloy and a cobalt-base alloy.

10. The method of claim 8, wherein the step of providing the article includes the step of
providing the article that is a component of a gas turbine engine.

11. The method of claim 8, wherein the step of providing the article includes the step of
providing the article that is a gas turbine vane.

12. The method of claim 8, wherein the step of depositing the metallic coating includes the step of
depositing the metallic coating that is a precipitation-strengthened nickel-base superalloy.

13. The method of claim 8, wherein the step of depositing the protective coating includes the step of
depositing the aluminide diffusion coating layer to a thickness of about 0.0005 to about 0.004 inches thick.

14. The method of claim 8, wherein the step of depositing the protective coating includes the step of
depositing a ceramic thermal barrier coating overlying and contacting the aluminide layer to a thickness of about 0.005 to about 0.020 inches thick.

15. The method of claim 8, wherein the step of depositing the metallic coating includes the step of
applying the metallic coating as a precipitation-strengthened nickel-base superalloy having less than about 10 percent by weight aluminum, wherein the metallic coating is not a diffusion aluminide protective coating having above about 16 percent by weight aluminum and is not an MCrAlY-type overlay coating having above about 16 percent by weight aluminum, and wherein the substrate is a component of a gas turbine engine that has previously been in service without the metallic coating thereon.

16. The method of claim 8, wherein the step of depositing the metallic coating includes the step of
applying the metallic coating as a precipitation-strengthened nickel-base superalloy having a metallic-coating composition different from the substrate composition, and wherein the substrate has previously been in service without the metallic coating thereon.

17. The method of claim 8, wherein the step of providing the article includes the step of
providing the article as a turbine vane, wherein the key dimension is a thickness of the turbine vane required to maintain a maximum throat separation between the turbine vane and an adjacent turbine vane.

* * * * *